United States Patent
Poffenberger (10) Patent No.: US 10,091,544 B1
(45) Date of Patent: Oct. 2, 2018

(54) VISUAL IDENTIFIER TO TRIGGER AN ACTION

(75) Inventor: Michael Lee Poffenberger, Sandy Springs, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 13/588,725

(22) Filed: Aug. 17, 2012

(51) Int. Cl.
*H04N 7/173* (2011.01)
*H04N 21/431* (2011.01)
*H04N 21/8358* (2011.01)

(52) U.S. Cl.
CPC ..... *H04N 21/4316* (2013.01); *H04N 21/8358* (2013.01)

(58) Field of Classification Search
CPC ........... H04N 21/4316; H04N 21/4318; H04N 21/488; H04N 21/4884; H04N 21/4886; H04N 21/4888; H04N 21/44008; H04N 21/44204; H04N 21/4542; H04N 21/4545; H04N 21/45452; H04N 21/45455; H04N 21/45457; H04N 21/4627
USPC ........ 725/20, 34, 52, 138, 136, 139, 112, 28
See application file for complete search history.

(56) References Cited

U.S. PATENT DOCUMENTS

| | | | | |
|---|---|---|---|---|
| 5,828,402 | A * | 10/1998 | Collings | H04N 5/44543 348/460 |
| 5,937,331 | A * | 8/1999 | Kalluri et al. | 725/146 |
| 6,415,438 | B1 * | 7/2002 | Blackketter et al. | 725/136 |
| 6,519,770 | B2 * | 2/2003 | Ford | H04N 7/088 348/E7.031 |
| 7,058,963 | B2 * | 6/2006 | Kendall et al. | 725/21 |
| 7,536,706 | B1 * | 5/2009 | Sezan et al. | 725/113 |
| 7,805,747 | B2 * | 9/2010 | Klappert et al. | 725/112 |
| 8,634,703 | B1 * | 1/2014 | Barton | H04N 21/47202 386/261 |
| 8,667,539 | B2 * | 3/2014 | Hartson | H04N 5/44504 725/19 |
| 2002/0059644 | A1 * | 5/2002 | Andrade et al. | 725/136 |
| 2002/0122137 | A1 * | 9/2002 | Chen | H04N 5/38 348/552 |
| 2003/0012548 | A1 * | 1/2003 | Levy et al. | 386/46 |
| 2003/0070169 | A1 * | 4/2003 | Beyers et al. | 725/51 |
| 2007/0006077 | A1 * | 1/2007 | Grubbs | H04N 5/44591 715/716 |
| 2007/0067800 | A1 * | 3/2007 | Wachtfogel et al. | 725/42 |
| 2007/0199015 | A1 * | 8/2007 | Lopez et al. | 725/31 |
| 2008/0049971 | A1 * | 2/2008 | Ramos | G06F 17/30026 382/100 |
| 2009/0089826 | A1 * | 4/2009 | Card, II | H04N 7/163 725/25 |
| 2009/0150553 | A1 * | 6/2009 | Collart | G06F 17/30017 709/229 |

(Continued)

*Primary Examiner* — Gigi L Dubasky
(74) *Attorney, Agent, or Firm* — Merchant & Gould (57) ABSTRACT

Video content is received and processed to produce the plurality of video frames for displaying the video content on a video rendering device. A video image is embedding into one of a plurality of video frames. Each of the plurality of video frames are analyzed to detect the embedded video image. Upon detecting the embedding video image, an action associated with the embedded video image is triggered. A viewer indication of interest is received in response to the triggering the action associated with the embedded video image. A response to the receipt of the viewer indication of interest is implemented.

13 Claims, 7 Drawing Sheets

(56) References Cited

U.S. PATENT DOCUMENTS

| | | | | |
|---|---|---|---|---|
| 2011/0126223 A1* | 5/2011 | Shahraray | ........ | H04N 21/44218 725/28 |
| 2011/0194730 A1* | 8/2011 | Rhoads | ............. | G06F 17/30876 382/100 |
| 2012/0005311 A1* | 1/2012 | Livingston | .......... | G06F 21/6218 709/219 |
| 2012/0096499 A1* | 4/2012 | Dasher | ............... | H04N 21/4223 725/87 |
| 2012/0117221 A1* | 5/2012 | Katpelly | .......... | G11B 20/10527 709/224 |
| 2012/0272279 A1* | 10/2012 | Lim | ................. | H04N 21/23892 725/109 |
| 2012/0304224 A1* | 11/2012 | Hines | ............... | H04N 21/44008 725/34 |
| 2013/0225151 A1* | 8/2013 | King | ................. | H04M 1/72577 455/419 |
| 2015/0007219 A1* | 1/2015 | Blanchard et al. | ............. | 725/32 |

* cited by examiner

VISUAL IDENTIFIER TO TRIGGER AN ACTION

FIELD OF THE INVENTION

This disclosure relates in general to providing additional services to consumers of video content, and more particularly to using a visual identifier embedded in a frame of video content to trigger an action communicated to the consumer.

BACKGROUND

Television networks sell advertising during television programs and generally receive revenue for use of the commercial airtime in proportion to the program's viewership, i.e., ratings. Digital video recorders (DVRs) allow time shifting of programs on a real-time basis, which can diminish the amount of commercials watched by viewers.

Advertisers have tried to hype their commercials, for example, for new product releases, before they are going to be shown during a television event. Also, advertisers have utilized actors from television commercials. In view of the current viewing habits of consumers, commercials need to be more effective in enticing viewers to purchase advertised products.

Various technologies have been used to ease the insertion of advertisements in between program segments, such as using automatic computer control into cable or satellite broadcasts. Further, satellite viewers may receive broadcast advertisements from the local areas, rather than nationwide advertisements by a system that selectively transmits such advertisements to satellite viewers in certain areas.

However, even if a viewer is interested in the product or service being advertised, and would be interested in discovering more information about the product or service, the viewer often continues to watch the normal programming and waits to look into the product or service at a later, more convenient, time. Nevertheless, the viewer may forget about the advertisement completely or simply forget the name of the product or service when the viewer finally has time to look into the product or service further.

SUMMARY OF THE INVENTION

To overcome the limitations described above, and to overcome other limitations that will become apparent upon reading and understanding the present specification, embodiments for detecting a visual identifier in a frame of video content to trigger an action communicated to the consumer are disclosed.

The above-described problems are solved by analyzing a video frame for a pattern of pixels or visual identifier. A video rendering device looks for patterns in what is being displayed. When the device detects the visual identifier in a video frame, an action is triggered.

An embodiment includes a method for triggering an action corresponding to a visual identifier embedded in a video frame, comprising: receiving a video stream comprising a plurality of video frames, wherein one or more of the plurality of video frames includes a visual identifier corresponding to an action; analyzing each of the plurality of video frames to detect the visual identifier; detecting the visual identifier; identifying the action corresponding to the visual identifier; and triggering the action associated with the visual identifier.

Another embodiment includes a method for triggering an action corresponding to a visual identifier, comprising: receiving a video stream comprising a plurality of video frames; embedding a visual identifier corresponding to an action into one or more of the plurality of video frames; analyzing each of the plurality of video frames to detect the visual identifier; detecting the visual identifier; identifying the action corresponding to the visual identifier; and triggering the action associated with the visual identifier.

In another embodiment, a system triggering an action corresponding to a visual identifier in a video frame is disclosed. The system includes a video rendering device operable to: receive a video stream comprising a plurality of video frames, wherein one or more of the plurality of video frames includes a visual identifier corresponding to an action; analyze each of the plurality of video frames to detect the visual identifier; detect the visual identifier; identify the action corresponding to the visual identifier; and trigger the action associated with the visual identifier.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to using a visual identifier embedded in a frame of video content to trigger an action communicated to the consumer. According to embodiments, a visual identifier, such as a barcode, matrix code (quick response (QR) Code®), or other pattern of pixels may be inserted into a video frame. A video rendering device looks for patterns in what is being displayed. When the device detects the visual identifier in a video frame, an action is triggered.

Figure 1:
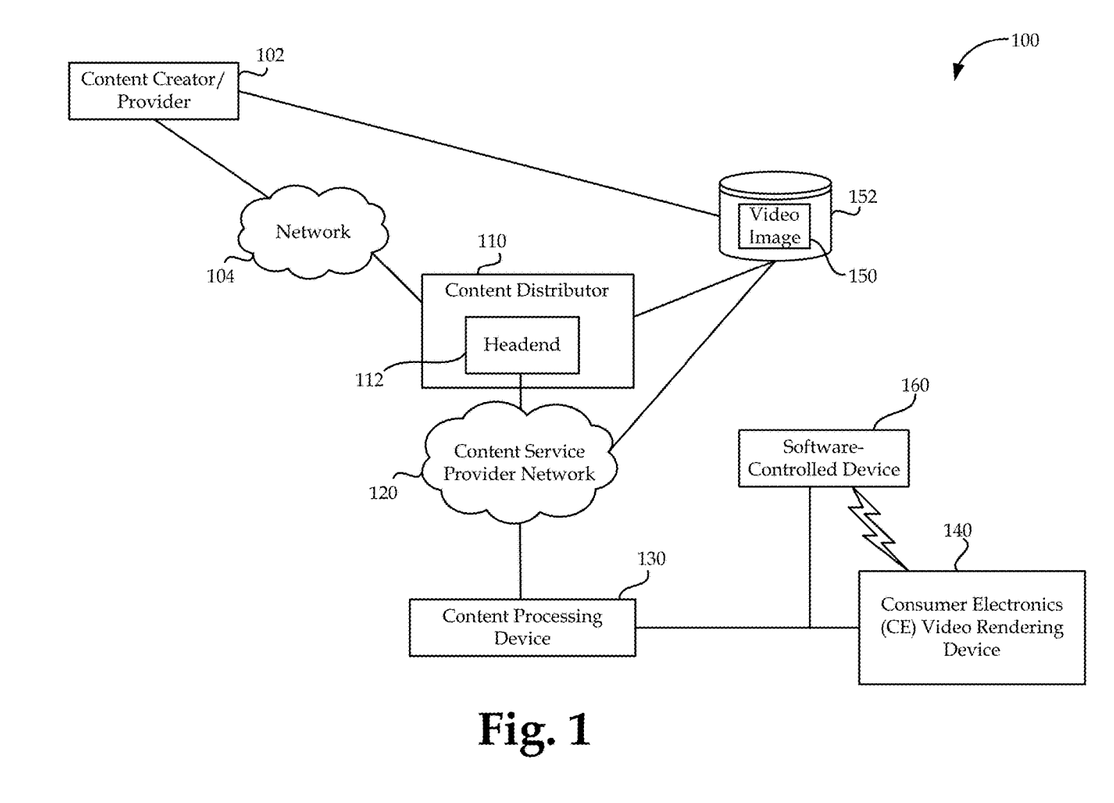
FIG. 1 illustrates a system for embedding a visual identifier in a frame of video content to trigger an action communicated to the consumer according to an embodiment.

FIG. 1 illustrates a system 100 for detecting a visual identifier in a frame of video content for triggering an action communicated to the consumer according to an embodiment. In FIG. 1, video content is provided from a content creator/provider 102 through a network 104 to a content distributor 110. For example, the content distributor 110 may be a cable television service provider, a satellite service provider, an internet service provider, etc. The content distributor 110 has a head end 112 that provides video content to a consumer through a content service provider distribution network 120. In the case of a cable service provider, the content service provider distribution network 120 may be a hybrid fiber coaxial (HFC) network. However, those skilled in the art will recognize that the content creator/provider 102 and the content distributor 110 may be a single entity.

The distribution network is coupled to a content processing device 130, such as a set top box (STB) or other type of converter box. The content processing device 130 receives the content from the head end 112 and prepares the content for rendering by a video rendering device or other consumer electronic device 140. Although described herein as separate devices, according to some embodiments, the content processing device 130 and the video rendering device 140 may be integrated into a single unit, such as a smart television.

A visual identifier 150 for triggering an action may be embedded into the video content at the content provider 102, at the content distributor 110, or at the content processing device 130. The visual identifier 150 may be one of various types of images including, but not limited to, barcodes matrix codes (sometimes referred to as quick response (QR) Codes®), and other patterns of pixels that is detectable and may have encoded information associated with it. As shown in FIG. 1, a visual identifier 150 may be stored in a storage device 152. The storage device 152 may be accessible by the content provider 102, by the content distributor 110 or by the content processing device 130. While the content provider 102, the content distributor 110 and the content processing device 130 may have access to a visual identifier 150 in a storage device 152 for the purpose of triggering an action, each of the content provider 102, the content distributor 110 and the content processing device 130 may have access to a storage device 152 uniquely and individually maintained. For example, the content distributor 110 may not have access to the same storage device 152 as the content provider. However, for simplicity, only one storage device 152 is shown in FIG. 1. Additional revenue-sharing arrangements may be developed based on the triggering of the action.

The video rendering device 140 analyzes the stream that it is being provided. The information for triggering an action may be placed in a location known to the video rendering device 140 or the video rendering device 140 may dynamically identify the triggering information. While the detection is performed by the video rendering device 140, the action that is performed may be based on information or data obtain from the storage device 152. Moreover, the triggering of an action may be applicable to response/action requirements from a user or by software via an interface. For example, the visual identifier trigger could be used for interactions between the rendering device 140 that detects the information for triggering an action and a software-controlled device 160, wherein the software controlled device 160 may be located independently from the location of the rendering device 140. In other words, the software-controlled device 160 may communicate with the rendering device 140, or other device coupled to the rendering device 140, through a wired or wireless network. In such an embodiment, the software-controlled device 160 may implement parental controls limits, wherein the rendering device 140 detects visual identifiers 150, which may be displayed at time intervals. The software-controlled device 160 may log each instance of timed visual identifier detection. Accordingly, upon the N-th time a timed visual identifier is logged by the software-controlled device 160, an action may be triggered. For example, a child may be watching a television show including visual identifiers 150 embedded into video frames of the show. The visual identifiers 150 may be embedded at every fifteen minutes of frames. A parental control may be applied such that upon detection of, for example, four visual identifiers 150, an action may be performed (i.e., the child may be allowed to watch one hour of television programming). The action may include such actions as a forced channel change, a message displayed on the television, a message sent to a parent that a child has watched 1 hour of the detected show, or the television being remotely disabled. As can be appreciated, the visual identifiers 150 may be embedded into certain shows, content categories, or programming on certain channels, etc.

As mentioned above, the video rendering device 140 may be an integrated content processing device 130 and video rendering device 140. The video rendering device 140 may be an interactive/smart television or an internet television. The video rendering device 140 or the content processing device 130 may also be configured to store information and offers for future viewing based on the triggering of the action on the video rendering device 140. Any device used to render video may be utilized for triggering of an action via a visual identifier 150, including STBs, IP video services, smart TVs, mobile phones, mobile phone applications, etc.

The system 100 is designed to allow for the recognition of an image in a single frame of video such that the system is able to identify, process and then perform an action by preprogrammed/predetermined behavior. Additional information, offers, content, etc. relevant or complimentary to the video being consumed may be provided, such that an operator or other entity does not need to engage in controlling or presenting these offers. As mentioned, this additional information may be provided via a storage device 152. Offers may be presented to consumers in a non-invasive, efficient manner, wherein the consumer is provided an interactive, enjoyable experience associated with the content the consumer is viewing while giving the service/content provider relevant data on what the user is watching.

Networks are designed to deliver analog and/or digital broadcast services from a head end 112 to the subscriber. In a cable TV system, the hybrid fiber coax (HFC) network may deliver both analog and digital signals. A satellite system delivers digital signals to a receiving dish that is converted to signals for display on a television or via other content display devices. Many different processing techniques may be performed on data. Most commonly, digital processing for video and audio content is usually based on MPEG standards. However, in view of the above, the signals providing content to subscribers/viewers may be delivered using analog and/or digital signals and such signals may be processed before transmission using many different techniques.

Figure 2:
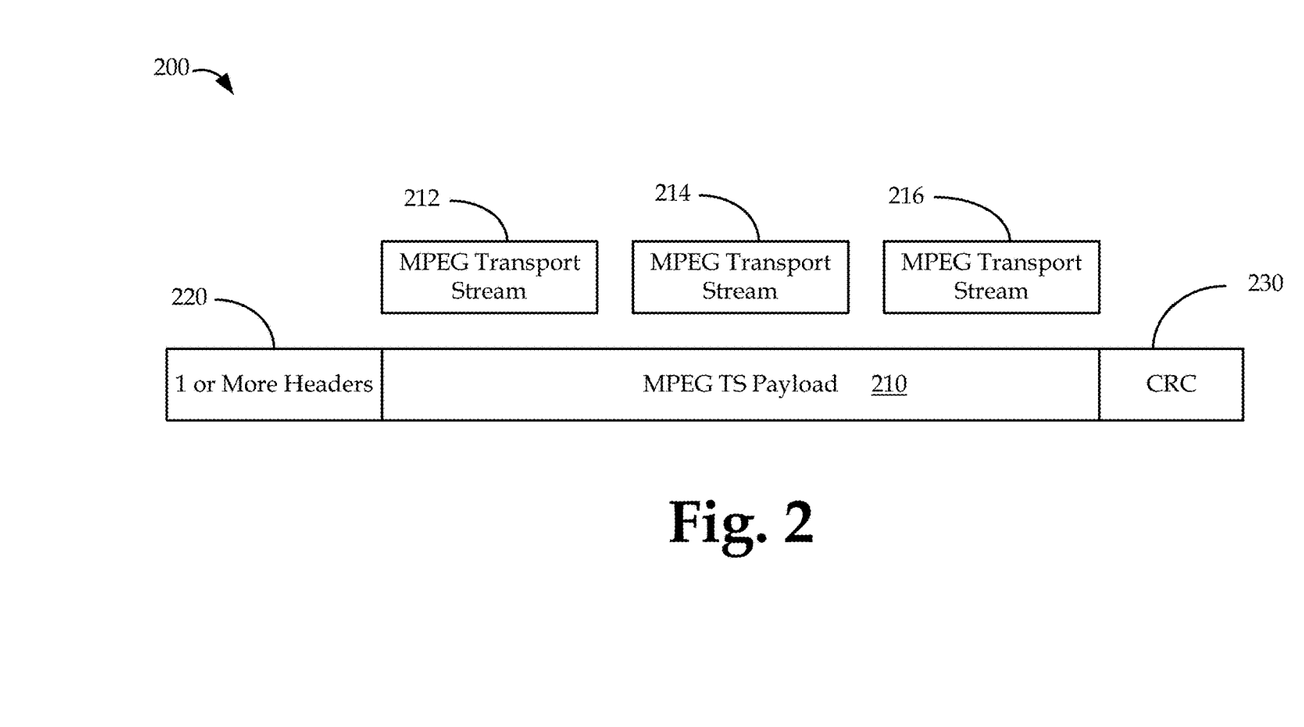
FIG. 2 shows an MPEG packet having a MPEG TS payload included therein for providing content to a viewer according to one embodiment.

FIG. 2 shows an MPEG packet 200 for providing content to a viewer according to one embodiment. The MPEG packet 200 may include a MPEG transport stream (TS) payload 210 that is formed from multiple MPEG transport streams 212, 214, 216. The MPEG packet 200 may also include one or more headers 220. For example, the MPEG packet may include a real-time transport protocol (RTP) header and then an Ethernet header. In addition, the MPEG packet may include error correction 230, e.g., a cyclic redundancy code (CRC) that may be appended to the end of the MPEG packet.

Figure 3:
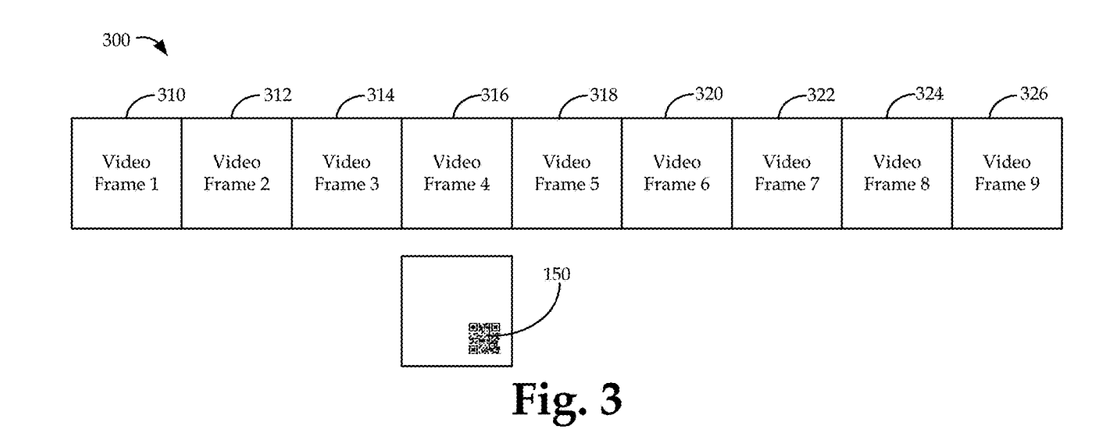
FIG. 3 shows video frames provided to a viewing device according to an embodiment.

FIG. 3 shows a plurality of video frames 300 provided to a viewing device according to an embodiment. For example, the MPEG packets 200 described above with reference to FIG. 2 may be processed to produce individual video frames 310-326. However, those skilled in the art will recognize that content may be provided using any video format that employs frames. In FIG. 3, a visual identifier 150, e.g., a matrix code, may be provided for inclusion in one of the video frames 310-326. Those skilled in the art will recognize that the visual identifier may be embedded in any of the video frames 310-326 or in several of the video frames 310-326. For example, for variable frame video formats, the image may be embedded in the first frame available.

Figure 4:
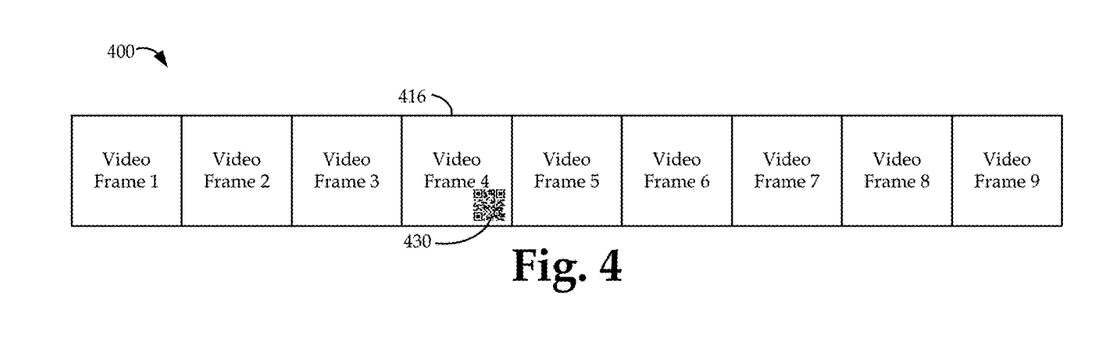
FIG. 4 shows video frames according to an embodiment.

FIG. 4 shows a plurality of video frames 400 according to an embodiment. In FIG. 4, the fourth video frame 416 is shown having the visual identifier, i.e., the matrix code, embedded therein. The image/code 430 that is inserted into the video frame 416 allows a video rendering device to look for patterns in what is being displayed. For example, a pattern of pixels (visual identifier 150), such as a matrix code (e.g., quick response Code®), may be displayed in a certain location as shown. Thus, a visual identifier 150 in the form of a matrix code 430 may be provided in a video frame 416 of an advertisement for triggering an action when the matrix code 430 is detected by the video rendering device. For example, when the matrix code 430 is detected, the device may be configured to obtain another code for displaying a pop-up on the video interface asking a consumer if they want to obtain more information on the product associated with the commercial.

The video frame 416 having the matrix code 430 embedded therein may represent the blank area between a program and a commercial that tells the video rendering device to perform an action 27 seconds into a 30 second long commercial, e.g., asking the viewer if they want to obtain more information at the 27 second mark of the 30 second commercial. The embedding of the image 430 may be performed by the creator of the content, by a distributor of the content, or by a content service provider, such as a cable company, satellite service company, etc.

Figure 5:
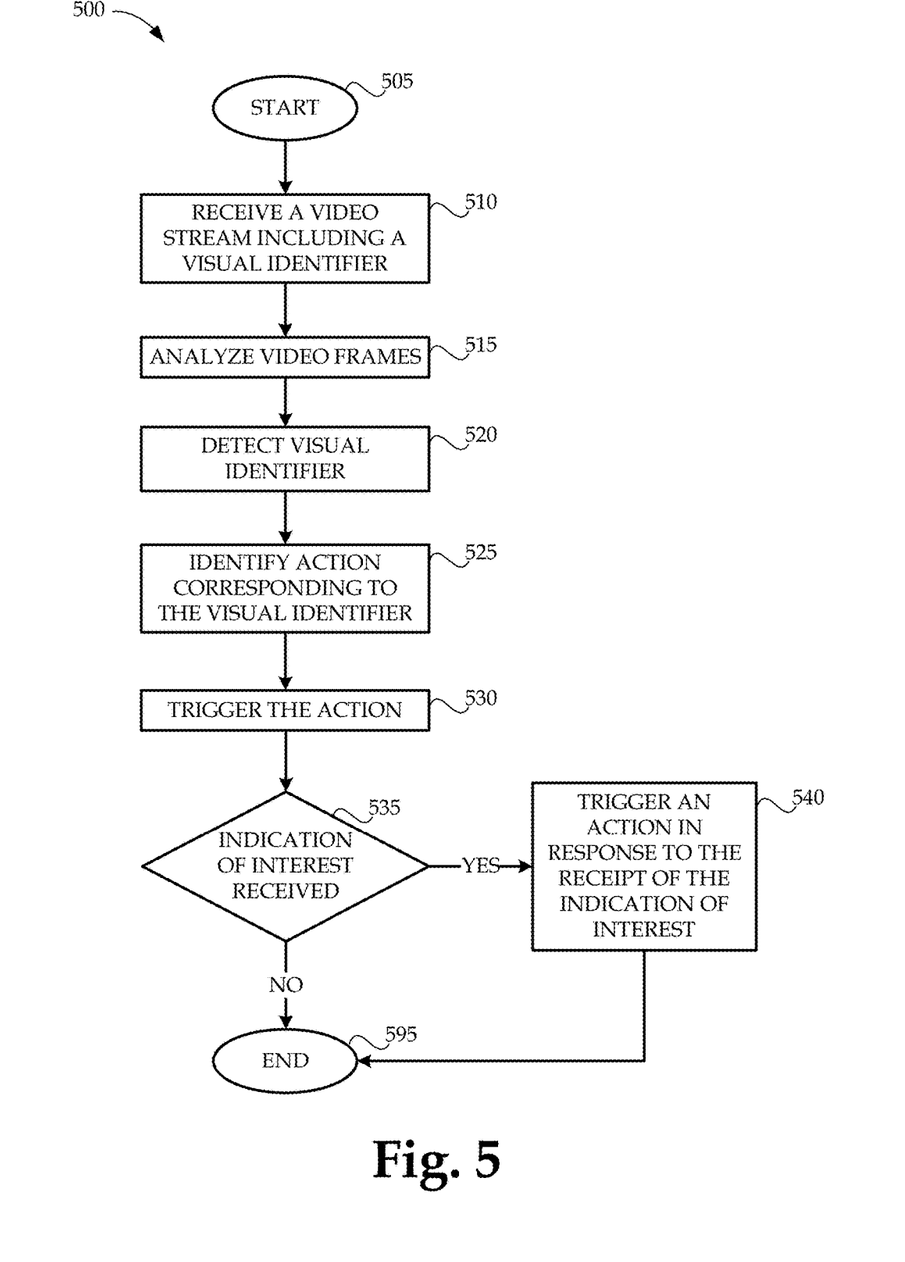
FIG. 5 illustrates a block diagram of a process of triggering an action corresponding to a visual identifier embedded in a video frame according to an embodiment.
Figure 6:
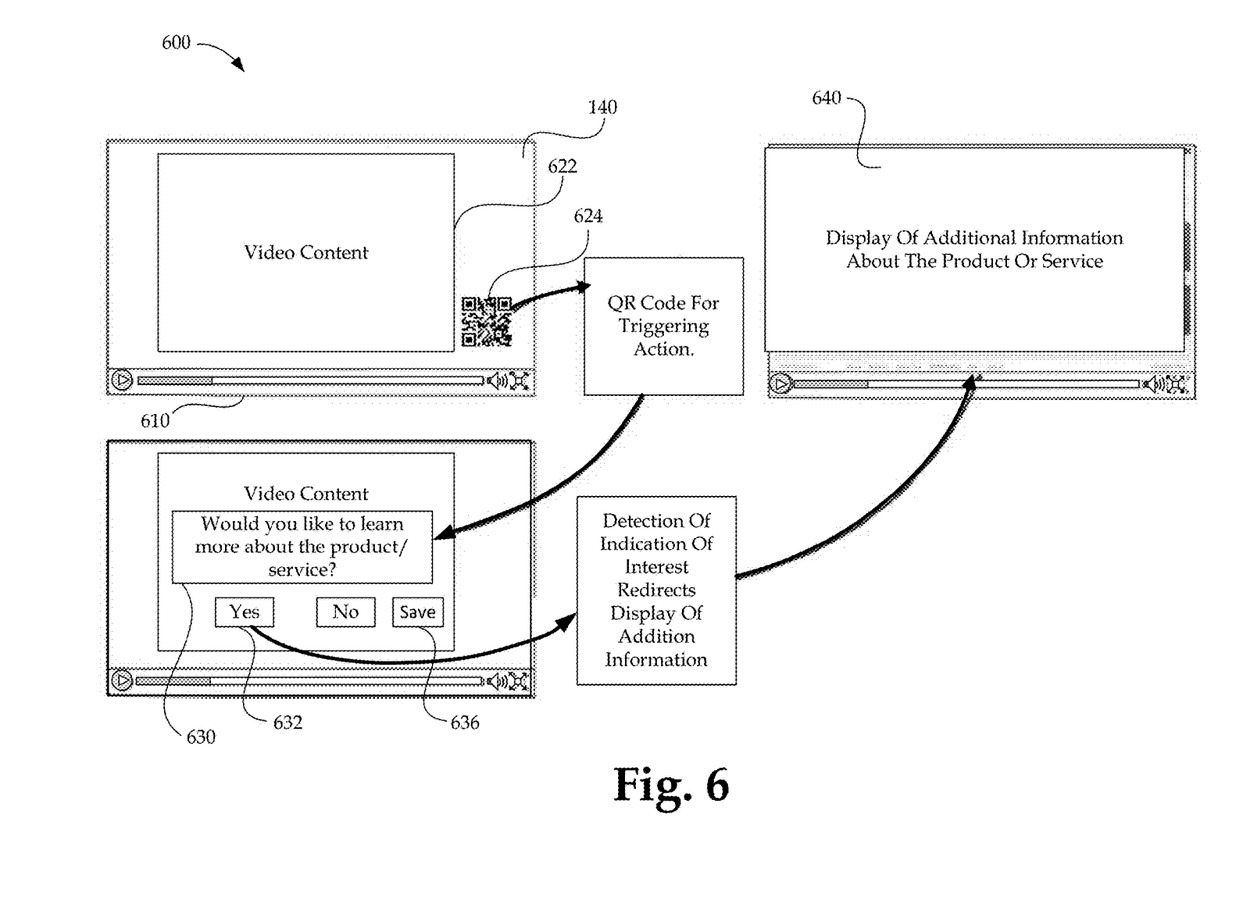
FIG. 6 illustrates the triggering of an action by an embedded image in a video frame according to an embodiment.

FIG. 5 illustrates a block diagram of a process of triggering an action corresponding to a visual identifier embedded in a video frame according to an embodiment. FIG. 6 illustrates the triggering of an action 600 upon detection of an embedded visual identifier 150 in a video frame according to an embodiment. Reference may be made to FIG. 6 for illustration of the process described in FIG. 5.

The process 500 starts at operation 505 and proceeds to operation 510 where a video stream comprising a plurality of video frames is received, the video stream including a visual identifier 150 in one or more of the plurality of video frames. In FIG. 6, a video rendering device 140 is shown displaying a video frame 620. The video frame 620 may include video content 622 and a visual identifier 150. As one example, the visual identifier may be a matrix code 624. According to one example, the visual identifier 150 (matrix code 624) may be inserted in the lower right hand part of the video frame 620 of an advertisement.

Referring again to FIG. 5, at operation 515, the video frames 620 may be analyzed, and at operation 520. A visual identifier 150 may be detected. As illustrated in FIG. 6, the video rendering device 140 may detect the matrix code 624. Accordingly, the visual identifier 150 (matrix code 624) displayed in the single frame 620 of video is captured and recognized. The video rendering device 140 may be a television, smart TV, a STB, an integrated content processing 130 and video rendering device 140, or any other device capable of displaying video images and visual identifiers 150. The visual identifier 150 acts as a trigger for an action on a smart TV, STB or any other system designed to show or display video (operation 525).

At operation 530, an action is performed, launched or triggered as video content is being consumed without disturbing the user experience and/or without requiring operator (meaning a distributor of video content to end consumer; for example, an MSO, IPTV provider, etc.) intervention or systems. Thus, upon recognition, the device 140 systematically performs a predetermined and/or preprogrammed action, such as launching a widget, launching a pop-up, prompting a user to view an offer, etc.

In FIG. 6, the matrix code 524 may trigger a system to launch a query 630 for determining whether the viewer wants to obtain more information regarding the offer associated with the matrix code 624 (operation 535). If the consumer decides to obtain more information, a viewer indication, e.g., selecting "yes" 632, causes additional information 640 to be displayed on the video rendering device 140, e.g., a redirect to an onscreen web page for the product in question (operation 540).

Visual identifiers 150 that may be embedded in a video frame 620 include matrix codes, bar codes and other images. The video rendering device 140 may be configured to perform ad-hoc image recognition in varying locations, colors, schema, etc. In response to the indication of interest 632, offers or information 640 may be queued. For example, instead of immediately viewing a "call to action" question, e.g., view more offers 630, a save option 636 would allow a user to put the offer into a saved list of offers to view/review later or to "bookmark" information. The process ends at operation 595.

Figure 7:
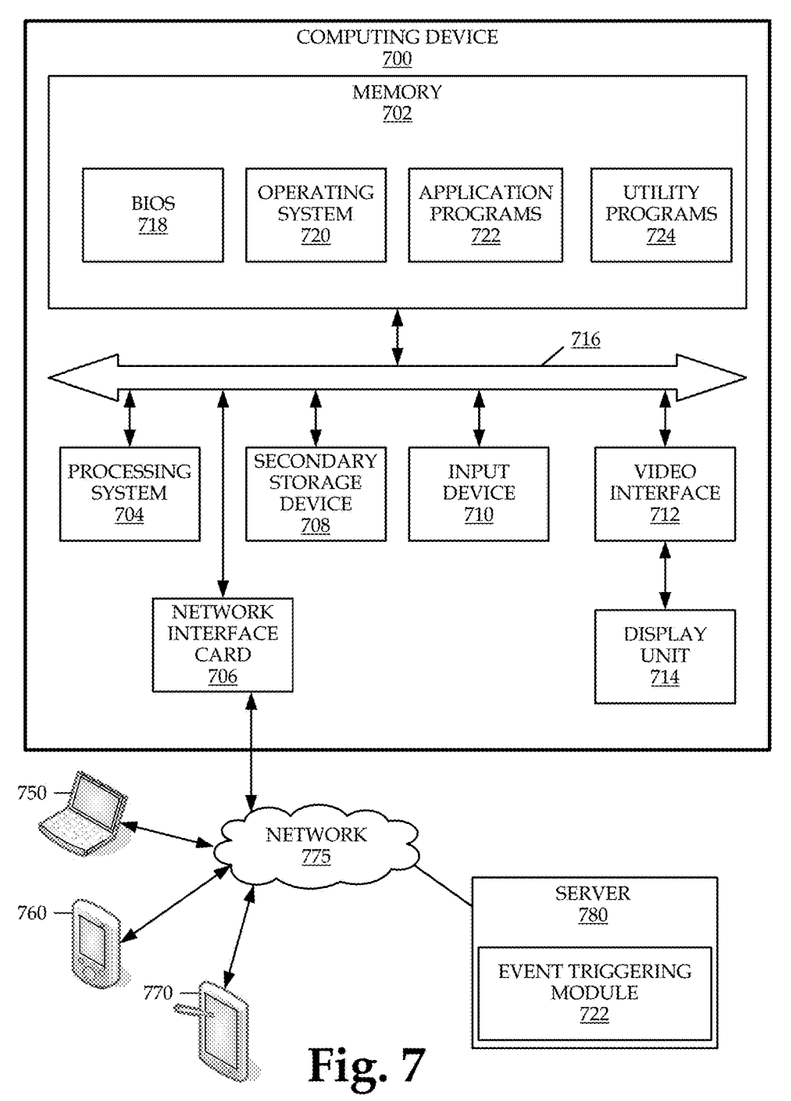
FIG. 7 is a block diagram illustrating example physical components of a computing device and a system architecture that includes an event triggering module for detecting a visual identifier embedded in a video frame of displayed content according to an embodiment.
Figure 8A:
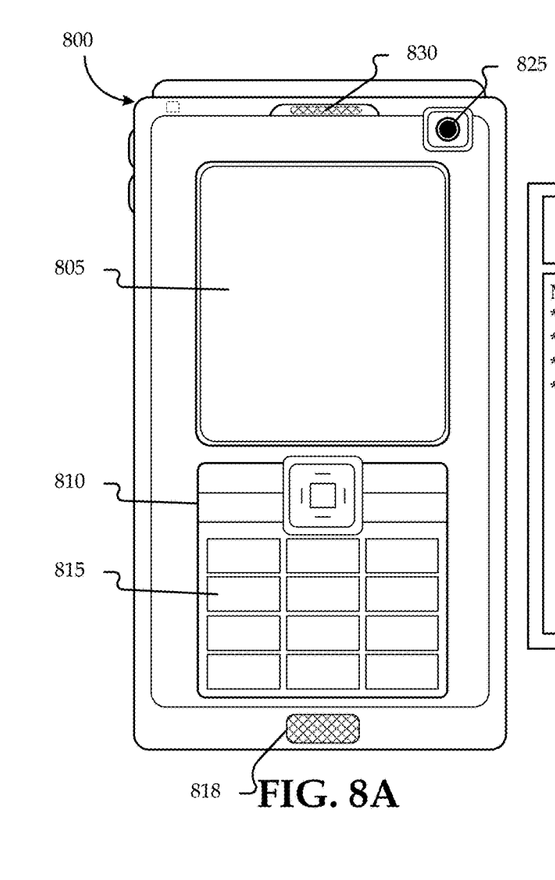
FIGS. 8*a-b* illustrate a suitable mobile computing environment according to an embodiment.
Figure 8B:
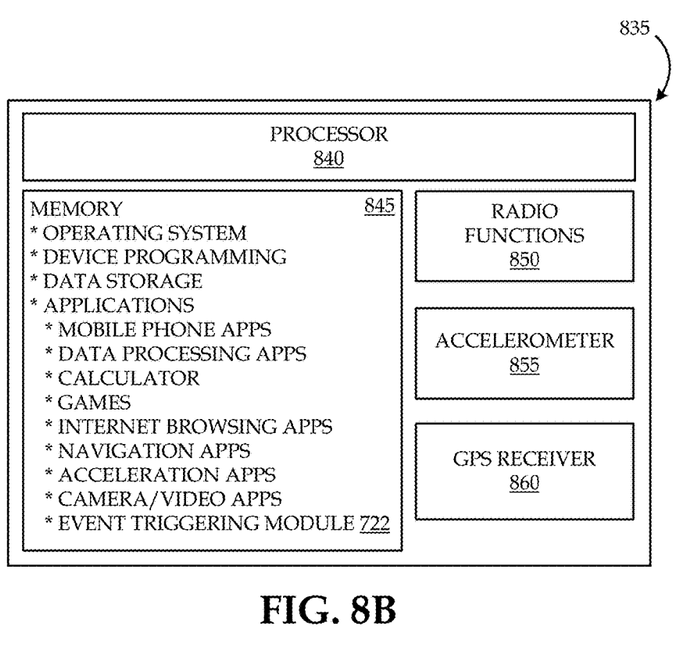

FIGS. 7-8 and the associated descriptions provide a discussion of a variety of operating environments in which embodiments may be practiced. However, the devices and systems illustrated and discussed with respect to FIGS. 7-8 are for purposes of example and illustration and are not limiting of a vast number of computing device configurations that may be utilized for practicing embodiments, described herein.

FIG. 7 is a block diagram illustrating example physical components of a computing device 700 with which embodiments may be practiced. In some embodiments, an event triggering module 722 may be implemented using one or more computing devices like the computing device 700. It should be appreciated that in other embodiments, the event triggering module 722 may be implemented using computing devices having hardware components other than those illustrated in the example of FIG. 7.

Computing devices may be implemented in different ways in different embodiments. For instance, in the example of FIG. 7, the computing device includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules.

The memory 702 includes one or more computer-readable storage media capable of storing data and/or computer-executable instructions. According to one embodiment, the event triggering module 722 may be stored locally on computing device 700. Memory 702 thus may store the computer-executable instructions that, when executed by processor 704, cause the event triggering module to detect a visual identifier embedded in a video frame of displayed content as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, event triggering module 722. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 7 may be integrated onto a single integrated circuit. When operating via such a single integrated circuit, the functionality, described herein, with respect to the event triggering module 722 may be operated via application-specific logic integrated with other components of the computing device/system 700 on the single integrated circuit.

A server 780 may provide the event triggering module 722 to client devices. As one example, server 780 may be a web server providing the event triggering module 722 over the web. Server 780 may provide the event triggering module 722 over the web to clients through a network 775. Examples of clients that may obtain the event triggering module 722 include computing device 750, which may include any general purpose personal computer (such as computing device 700), a tablet computing device 770 and/or mobile computing device 760, such as smart phones.

FIGS. 8a-b illustrate a suitable mobile computing environment, for example, a mobile computing device 800, a smart phone, a tablet personal computer, a laptop computer, and the like, with which embodiments may be practiced. With reference to FIG. 8a, an example mobile computing device 800 for implementing the embodiments is illustrated. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, an event triggering module 722 for detecting a visual identifier embedded in a video frame of displayed content as described with reference to FIGS. 1-6 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-6. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method, implemented by a computing device, for triggering an action corresponding to a visual identifier embedded in a video frame, comprising:
   receiving a video stream comprising a plurality of video frames, wherein one or more of the plurality of video frames includes a visual identifier corresponding to an action;
   analyzing each of the plurality of video frames to detect the visual identifier without viewer intervention of a rendering device;
   detecting via the rendering device the visual identifier without viewer intervention of the rendering device;
   in response to detecting the identifier in the video stream, accessing over a network information in a storage device for identifying via the rendering device the action corresponding to the visual identifier without viewer intervention of the rendering device; and
   triggering via the rendering device the action associated with the visual identifier without viewer intervention of the rendering device, wherein triggering via the rendering device the action associated with the visual identifier comprises triggering a query to a viewer without viewer intervention and, in response to receiving an indication from the viewer, subsequently triggering another device communicating to the rendering device to implement parental controls on the rendering device such that viewing of the video stream with the visual identifier on the rendering device is precluded and a message is provided to a parent.

2. The method of claim 1, wherein:
   detecting the visual identifier and identifying the action corresponding to the action includes tracking a number of times the visual identifier is detected; and
   triggering the action associated with the visual identifier includes enforcing the parental controls upon detecting the visual identifier a predetermined number of times.

3. The method of claim 1, wherein implementing parental controls includes one or more of:
   changing a channel;
   turning off a video rendering device; or
   providing a message to a user.

4. The method of claim 1, wherein the visual identifier corresponding to an action includes one of a matrix code, a barcode, or a pattern of pixels.

5. A method, implemented by a computing device, for triggering an action corresponding to a visual identifier, comprising:
   receiving a video stream comprising a plurality of video frames;
   embedding a visual identifier corresponding to an action into one or more of the plurality of video frames;
   analyzing each of the plurality of video frames to detect the visual identifier without viewer intervention of the rendering device;
   detecting via a rendering device the visual identifier without viewer intervention of the rendering device;
   in response to detecting the identifier in the video stream, accessing over a network information in a storage device for identifying via the rendering device the action corresponding to the visual identifier without viewer intervention of the rendering device; and
   triggering via the rendering device the action associated with the visual identifier without viewer intervention of the rendering device, wherein triggering via the rendering device the action associated with the visual identifier comprises triggering a query to a viewer without viewer intervention and, in response to receiving an indication from the viewer, subsequently triggering another device communicating to the rendering device to implement parental controls on the rendering device such that viewing of the video stream with the visual identifier on the rendering device is precluded and a message is provided to a parent.

6. The method of claim 5, wherein embedding the visual identifier comprises embedding the visual identifier in a predetermined area of the one or more of the plurality of video frames.

7. The method of claim 5, further comprising receiving video content and processing the received video content to produce the plurality of video frames for displaying the video content.

8. The method of claim 5, wherein the parental control includes one or more of changing a channel; tuning off a video rendering device; or providing a message to a user.

9. A system for triggering an action corresponding to a visual identifier embedded in a video frame, comprising:
   a service provider network;
   a video rendering device, on the service provider network, operable to:
   receive a video stream comprising a plurality of video frames, wherein one or more of the plurality of video frames includes a visual identifier corresponding to an action;
   analyze each of the plurality of video frames to detect the visual identifier without viewer intervention of a rendering device;
   detect via the rendering device the visual identifier without viewer intervention of the rendering device;
   in response to detecting the identifier, access over a network information in a storage device to identify via the rendering device the action corresponding to the visual identifier without viewer intervention of the rendering device; and
   trigger via the rendering device the action associated with the visual identifier without viewer intervention of the rendering device, wherein triggering via the rendering device the action associated with the visual identifier comprises triggering a query to a viewer without viewer intervention and, in response to receiving an indication from the viewer, subsequently triggering another device communicating to the rendering device to implement parental controls on the rendering device such that viewing of the video stream with the visual identifier on the rendering device is precluded and a message is provided to a parent.

10. The system of claim 9, wherein the visual identifier corresponding to an action is one of a matrix code, a barcode, or a pattern of pixels.

11. The system of claim 9, wherein the video rendering device is further operable to:
   track a number of times the visual identifier is detected; and
   implement the parental controls upon detecting the visual identifier a predetermined number of times, wherein the parental controls includes one or more of:
   changing a channel;
   turning off the video rendering device; or
   providing a message to a user.

12. The method of claim 1 wherein the rendering device is a set top box.

13. The method of claim 1 wherein the rendering device is a television.

* * * * *